(12) United States Patent
Bauman

(10) Patent No.: US 6,974,001 B2
(45) Date of Patent: Dec. 13, 2005

(54) TEMPERATURE COMPENSATING GAS SPRING

(75) Inventor: Walter Douglas Bauman, Wixom, MI (US)

(73) Assignee: ArvinMeritor Technology, LLC., Troy, MI (US)

( * ) Notice: Subject to any disclaimer, the term of this patent is extended or adjusted under 35 U.S.C. 154(b) by 81 days.

(21) Appl. No.: 10/716,694

(22) Filed: Nov. 19, 2003

(65) Prior Publication Data

US 2005/0104267 A1 May 19, 2005

(51) Int. Cl.⁷ ............................................... F16F 9/52
(52) U.S. Cl. ..................................... 188/277; 188/315
(58) Field of Search ............................... 188/276, 277, 188/315, 266.2, 266.7, 268, 270, 278, 313, 188/314, 322.13, 322.15; 267/64.28, 64.26, 267/64.117, 64.16

(56) References Cited

U.S. PATENT DOCUMENTS

| | | | | |
|---|---|---|---|---|
| 3,674,120 | A | * | 7/1972 | Johnson ...................... 188/277 |
| 4,408,751 | A | | 10/1983 | Dodson et al. |
| 4,485,899 | A | * | 12/1984 | Grundei ...................... 188/277 |
| 4,560,041 | A | * | 12/1985 | Wossner ..................... 188/278 |
| 4,570,912 | A | | 2/1986 | Dodson et al. |
| 5,628,496 | A | | 5/1997 | Chamberlio |
| 5,702,091 | A | | 12/1997 | Perrin et al. |
| 5,887,857 | A | | 3/1999 | Perrin |
| 5,961,102 | A | | 10/1999 | Oyaizu |
| 5,988,608 | A | | 11/1999 | Koch |
| 6,053,486 | A | | 4/2000 | Schuitema et al. |
| 6,357,612 | B1 | * | 3/2002 | Monaco et al. ............... 213/43 |
| 6,425,279 | B1 | | 7/2002 | Jeffries |

FOREIGN PATENT DOCUMENTS

JP      2002089611     *   3/2002

* cited by examiner

Primary Examiner—Robert A. Siconolfi
Assistant Examiner—Devon Kramer
(74) Attorney, Agent, or Firm—Carlson, Gaskey & Olds

(57) ABSTRACT

A gas spring provides an outer cylinder which is partitioned into a multiple of auxiliary volumes. A multiple of temperature compensation valves are located within a piston cylinder which sequentially open or close. As the temperature increases, the temperature compensation valves open sequentially and as the temperature decreases the temperature compensation valves close in reverse sequence. Between each pair of adjacent temperature compensation valves is a passage which provides communication between the working volume and an auxiliary volume to effectively increase or decrease the working volume of gas within cylinder through communication with or isolation of the auxiliary volumes.

12 Claims, 2 Drawing Sheets

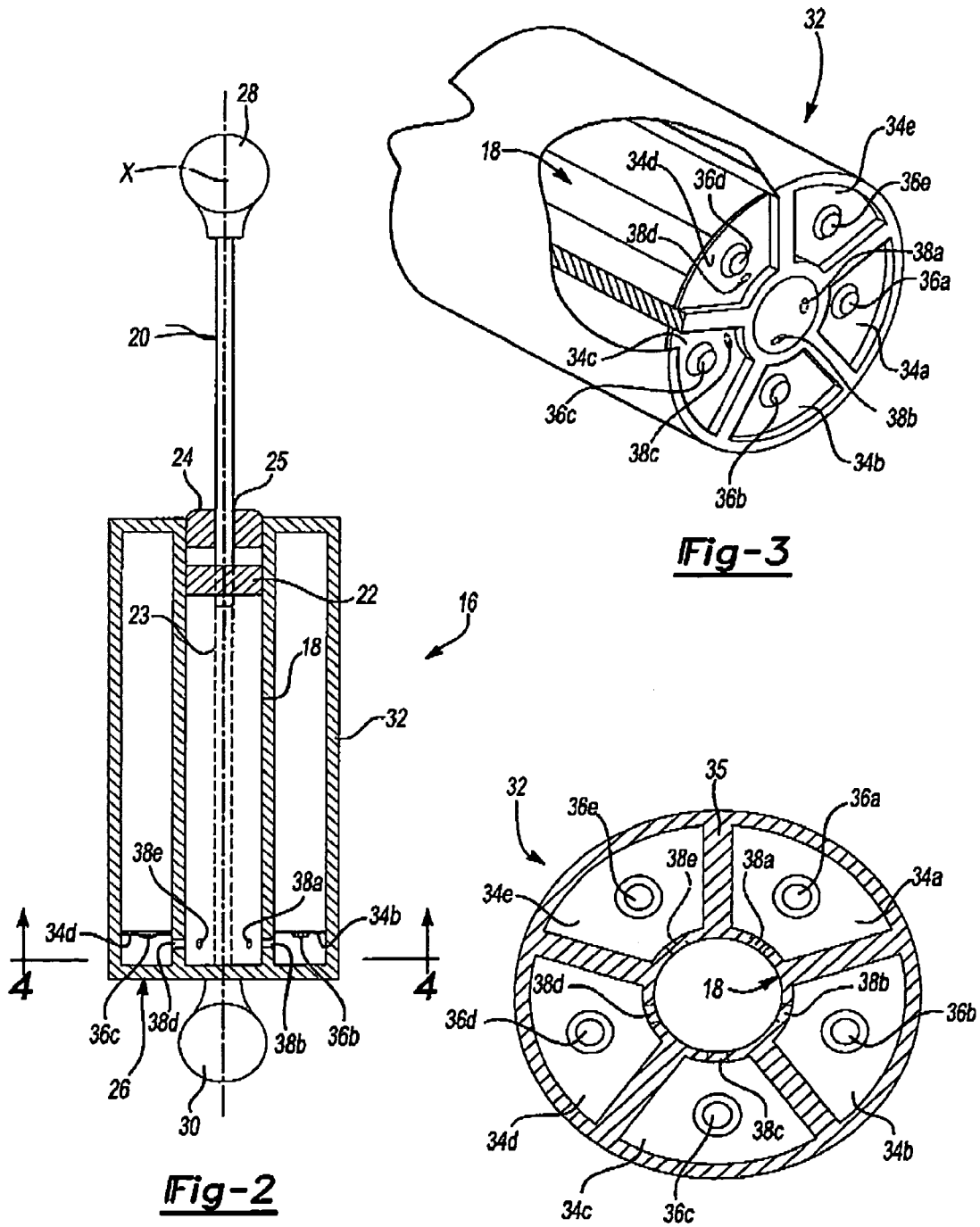

TEMPERATURE COMPENSATING GAS SPRING

BACKGROUND OF THE INVENTION

The present invention relates to a gas spring, and more particularly to a gas spring having a multiple of auxiliary volumes located about a central piston cylinder.

Pneumatic or gas springs are utilized in various commercial articles including the automotive industry. Gas springs are also utilized in many other fields to provide a counterbalance force for closure units, such as lids, doors, and cabinets, and amongst others where the gas springs operate as replacements for mechanical spring type fittings. In some fields of use, such as automotive, the change of the surrounding temperature can be quite substantial.

When the temperature drops, the pressure of the gas within the spring unit drops and concurrently therewith the force holding the piston rod extended or in the hold-open position often drops below that required to hold the closure member in an open position. Conversely, at higher temperatures the force is often too high which may make the closing member difficult to move. To counter these disadvantages, the industry has evidenced a desire to have pneumatic springs which in some manner will have their output force compensated for temperature changes.

One known temperature compensation gas spring utilizes two chambers within the gas spring body in which the piston reciprocates. The chambers are defined along an axis of reciprocation of the gas spring. Between the two chambers form a working chamber where the piston reciprocates and a storage chamber that is divided by a temperature responsive valve. When the temperature rises past a predetermined value, the valve is closed and the working volume is reduced.

Although effective, the known temperature compensation gas springs must be of an increased length to provide space for both chambers and temperature responsive valves and provides compensation in one single step. Disadvantageously, the additional length may preclude usage in many applications.

Accordingly, it is desirable to provide a temperature compensation gas spring which is effective yet compact in length and allows for compensation to occur in multiple steps.

SUMMARY OF THE INVENTION

The gas spring according to the present invention provides an outer cylinder which is partitioned into a multiple of auxiliary volumes. A multiple of temperature compensation valves are located within the outer cylinder. As the temperature increases, the temperature compensation valves open sequentially and as the temperature decreases the temperature compensation valves close in reverse sequence to increase or decrease the working volume.

The temperature compensation valves are located adjacent the near the opposite end of the strut. Between the center working chamber and the outer chambers are passages, which provide communication between a working volume and a respective auxiliary volume in the outer cylinder to effectively increase or decrease the working volume of gas within cylinder through communication or isolation of auxiliary volumes. As the working volume is progressively increased by communicating the working volume with the auxiliary volumes in response to progressively lower temperatures, a relatively constant predetermined hold open output force is provided over a wide range of temperature change. Moreover, the gas spring is extremely compact yet provides a heretofore unattainable number of partitioned auxiliary volumes to provide a more gradual and refined shift in desired output force relative to temperature.

The present invention therefore provides a temperature compensation gas spring which is effective yet compact in length.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is a schematic partial sectional view of a gas spring designed according to the present invention;

FIG. 3 is a general perspective view of a gas spring body; and

FIG. 4 is a lateral sectional view of a gas spring.

DETAILED DESCRIPTION OF THE PREFERRED EMBODIMENT

Figure 1:
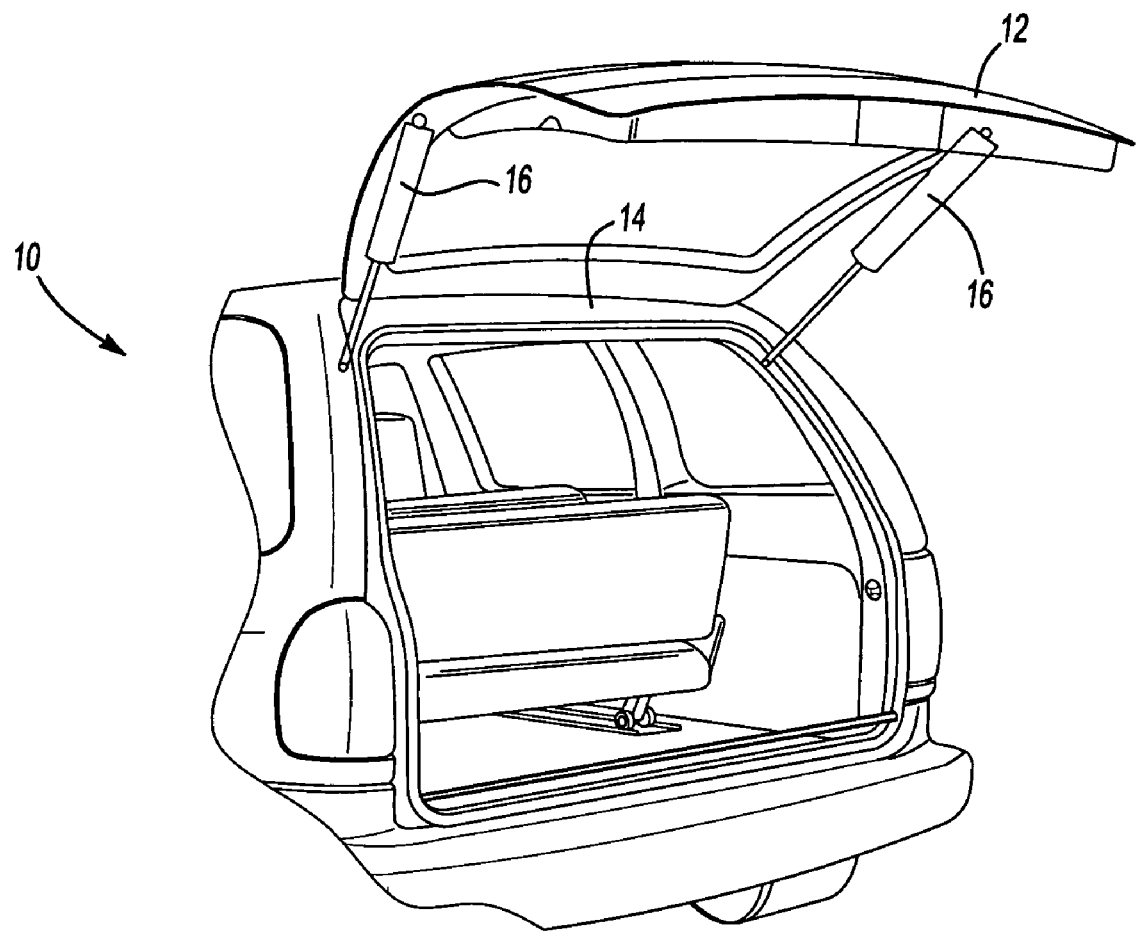
FIG. 1 is a general perspective view a vehicle closure member embodiment for use with the present invention.

FIG. 1 illustrates a general perspective view of a vehicle 10 having a closure member 12 which is hinged at an upper edge 14 and supported by a gas spring 16 on each side of the closure member 12 which operates as a counterbalance therefor. The gas spring may, of course, be used in many other applications.

Referring to FIG. 2, the gas spring 16 generally includes a piston cylinder 18 and a rod 20. A piston 22 is mounted to the rod 20 within a working volume 23 defined by the length of the piston cylinder 18 in which the piston 22 reciprocates.

The piston 22 reciprocates within the working volume 23 along axis X to separate the working volume 23 within the piston cylinder 18 into two volumes which are filled with gas (e.g., air, nitrogen or some other inert gas) under pressure as generally understood. The piston 22 is constructed to provide controlled by-pass flow of gas from one side of the piston to the other and, as generally understood, the piston provides a relatively free flow by-pass provided during the retraction or compression stroke and an "orifice" metered flow of gas past the piston during the extension or expansion stroke.

The rod 20 projects out through a rod end plug 24 of the piston cylinder 18, which defines an aperture 25 which allow linear passage of the piston rod 20 along gas spring axis X. An opposite end of the piston cylinder 18 is closed by an end plug 26. The distal end of the rod 20 and the closed end plug 26 of the piston cylinder 18 includes a respective connector 28, 30 which is typically a ball socket or other link for attachment of the gas spring 16. It should be understood that various attachment fixtures such as fixed threaded connections and movable connections such as ball joints will benefit from the present invention.

An outer cylinder 32 surrounds the piston cylinder 18. The outer cylinder 32 is preferably partitioned into a multiple of auxiliary volumes 34a, 34b, 34c, 34d, 34e by partitions 35 which extend from the outer surface of the piston cylinder 18 to an inner surface of the outer cylinder 32 (FIG. 3). The outer cylinder 32 preferably extends for the length of piston cylinder 18, however, it should be understood that shorter or longer lengths will also benefit from the present invention.

A multiple of temperature compensation valves 36a, 36b, 36c, 36d, 36e (illustrated schematically) are located within the piston cylinder 18 and operate as generally known. The temperature compensation valves 36a–36e are preferably bi-metal valves which open at a progressively increasing temperature. That is, as the temperature increases, the temperature compensation valves 36a–36e open sequentially and as the temperature decreases the temperature compensation valves 36a–36e close in reverse sequence to respectively increase or decrease the working volume 23.

The temperature compensation valves 36a–36e are located relatively close together along axis X. Between each pair of adjacent temperature compensation valves 36a–36e a passage 38a, 38b, 38c, 38d, 38e (FIG. 4) provides communication between working volume 23 and a respective auxiliary volume 34a–34e when an adjacent temperature compensation valve 36a–36e is open. Passages 38a–38e are preferably one or more radially displaced apertures through piston cylinder 18 to provide communication between piston cylinder 18 and the auxiliary volumes 34a–34e.

Temperature compensation valves 36a–36e selectively provide communication between working volume 23 and auxiliary volumes 34a–34e through passages 38a–38e (FIG. 4) to effectively increase or decrease the working volume of gas within piston cylinder 18 through communication or isolation of the auxiliary volumes 34a–34e. That is, the temperature compensation valves 36a–36e are sequentially activated to provide gas communication between piston cylinder 18 and one or more of the auxiliary volumes 34a–34e. When any of the temperature compensation valves 36a–36e close, gas will flow into the closed auxiliary volume 34a–34e but not out until the pressures are balanced.

As the working volume 23 is progressively increased by communicating the working volume 23 with the auxiliary volumes 34a–34e in response to progressively lower temperatures, a relatively constant predetermined hold open output force is provided over a wide range of temperature change. Moreover, the gas spring 16 is extremely compact yet provides a heretofore unattainable number of partitioned auxiliary volumes to provide a more gradual and refined shift in desired output force relative to temperature.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas spring comprising:
   a piston cylinder;
   a rod which moves a piston within said piston cylinder along an axis to define a working volume;
   an outer cylinder mounted about said piston cylinder and coaxial to said axis to define multiple auxiliary volume, a radial passages through said piston cylinder transverse to said axis to provide a communication path with said outer cylinder; and
   temperature compensation valves mounted within said piston cylinder to selectively communicate said working volume with said multiple auxiliary volumes through said radial passages in response to a predetermined temperature.

2. The gas cylinder as recited in claim 1, wherein said multiple auxiliary volumes extend along the length of said piston cylinder.

3. A gas spring comprising:
   a piston cylinder;
   a rod which moves a piston within said piston cylinder along an axis to define a working volume;
   an outer cylinder mounted about said piston cylinder and coaxial to said axis to define multiple auxiliary volumes, a radial passage through said piston cylinder transverse to said axis to provide a communication path with said outer cylinder; and
   temperature compensation valves mounted within said piston cylinder to selectively communicate said working volume with said multiple auxiliary volumes through said radial passage in response to a predetermined temperature;
   a partition defined between said piston cylinder and said outer cylinder to separate said auxiliary volume into a multiple of auxiliary volumes, said partition defined along a length of said piston cylinder.

4. A gas spring comprising:
   a piston cylinder;
   a rod which moves a piston within said piston cylinder along an axis to define a working volume;
   an outer cylinder mounted about said piston cylinder and coaxial to said axis to define a first auxiliary volume, a second auxiliary volume, and a third auxiliary volume between said piston cylinder and said outer cylinder;
   a first temperature compensation valve mounted within said piston cylinder to selectively communicate said working volume with said first auxiliary volume in response to a first predetermined temperature;
   a second temperature compensation valve mounted within said piston cylinder and adjacent said first temperature compensation valve to selectively communicate said working volume with said second auxiliary volume in response to a second predetermined temperature; and
   a third temperature compensation valve mounted within said piston cylinder and adjacent said second temperature compensation valve to selectively communicate said working volume with said third auxiliary volume in response to a third predetermined temperature.

5. The gas cylinder as recited in claim 4, wherein said first auxiliary volume, said second auxiliary volume, and said third auxiliary volume extend along the length of said piston cylinder.

6. The gas cylinder as recited in claim 4, wherein said first auxiliary volume is greater than a volume defined between said first and second temperature compensation valves, said second auxiliary volume is greater than a volume defined between said second and third temperature compensation valves, and said third auxiliary volume is greater than a volume defined between said third temperature compensation valve and a closed end of said piston cylinder.

7. The gas cylinder as recited in claim 4, wherein said first auxiliary volume, said second auxiliary volume, and said third auxiliary volume are sequentially communicated with said working volume.

8. The gas cylinder as recited in claim 4, wherein said first auxiliary volume, said second auxiliary volume, and said third auxiliary volume are sequentially communicated together.

9. The gas cylinder as recited in claim 4, wherein said piston cylinder defines a first passage, a second passage, and a third passage which respectively communicates said working volume with first auxiliary volume, said second auxiliary volume, and said third auxiliary volume.

10. The gas cylinder as recited in claim 4, wherein said piston cylinder defines a first passage, a second passage, and a third passage which respectively communicates said working volume with first auxiliary volume, said second auxiliary volume, and said third auxiliary volume, said first, second and third passage radially separated about said piston cylinder.

11. A gas spring comprising:
a piston cylinder,
a rod which moves a piston within said piston cylinder along an axis to define a working volume;
an outer cylinder mounted about said piston cylinder and coaxial to said axis to define a multiple of auxiliary volumes; and
a temperature compensation valve in communication with each of said multiple of auxiliary volumes to sequentially communicate said working volume with each of said multiple of auxiliary volumes in response to a predetermined temperature.

12. A gas spring comprising:
a piston cylinder;
a rod which moves a piston within said piston cylinder along an axis to define a working volume;
an outer cylinder mounted about said piston cylinder and coaxial to said axis to define multiple auxiliary volumes; and
temperature compensation valves mounted within said piston cylinder to selectively communicate said working volume with said multiple auxiliary volumes in response to a predetermined temperature
a partition defined between said piston cylinder and said outer cylinder to separate said multiple auxiliary volumes, said partition defined along a length of said piston cylinder.

* * * * *